United States Patent van Acquoij

[11] Patent Number: 5,909,243
[45] Date of Patent: Jun. 1, 1999

[54] METHOD AND SYSTEM FOR DIGITIZING SENSOR DATA IN SYNCHRONISM WITH SENSOR DATA READOUT

[75] Inventor: Catharinus van Acquoij, Lk Venray, Netherlands

[73] Assignee: Oce-Technologies B.V., Ma Venlo, Netherlands

[21] Appl. No.: 08/683,418

[22] Filed: Jul. 18, 1996

[30] Foreign Application Priority Data

Jul. 19, 1995 [EP] European Pat. Off. .............. 95201987

[51] Int. Cl.⁶ ........................... H04N 5/228; H04N 3/14; H04N 5/335
[52] U.S. Cl. ........................... 348/222; 348/308; 348/311
[58] Field of Search .................... 348/312, 311, 348/308, 295, 294, 222, 207

[56] References Cited

U.S. PATENT DOCUMENTS

| | | | |
|---|---|---|---|
| 3,892,916 | 7/1975 | Boulter | 375/330 |
| 4,439,788 | 3/1984 | Frame | 348/312 |
| 4,658,431 | 4/1987 | Yokota | 348/311 |
| 4,887,160 | 12/1989 | Kinoshita et al. | 348/237 |
| 5,122,649 | 6/1992 | Murayama | 348/308 |
| 5,282,041 | 1/1994 | Tani et al. | 348/299 |
| 5,450,129 | 9/1995 | Matoba | 348/312 |
| 5,642,163 | 6/1997 | Watari | 348/311 |

FOREIGN PATENT DOCUMENTS

| | | |
|---|---|---|
| 0438316 | 1/1991 | European Pat. Off. . |
| 3624252 | 7/1986 | Germany . |

OTHER PUBLICATIONS

Technisches Messen, vol. 57, No. 10, Oct. 1990, Munchen, DE pp. 366–380 R. Lenz 'Grundlagen der Videometrie, angewandt auf eine ultra –hochauflösende CCD –Farbkamera'.

Primary Examiner—Bryan Tung

[57] ABSTRACT

A method and apparatus for digitizing CCD-data, in which an A/D-converter is controlled such that the analog data are evaluated at the correct timings. Instead of delaying one of the clock signals, the analog data from the CCD is delayed by an analog delay circuit such as a low-pass filter. This makes it possible to adjust the delay time more easily, accurately and reliably.

16 Claims, 5 Drawing Sheets

Fig. 1(A)
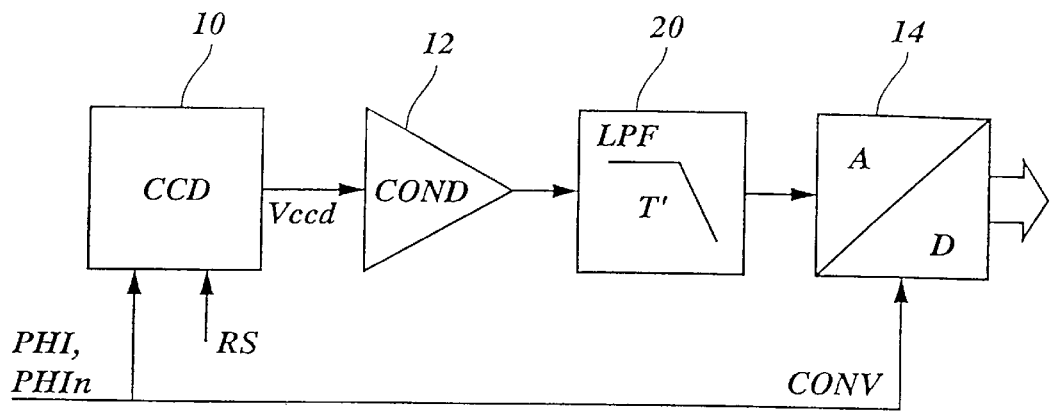
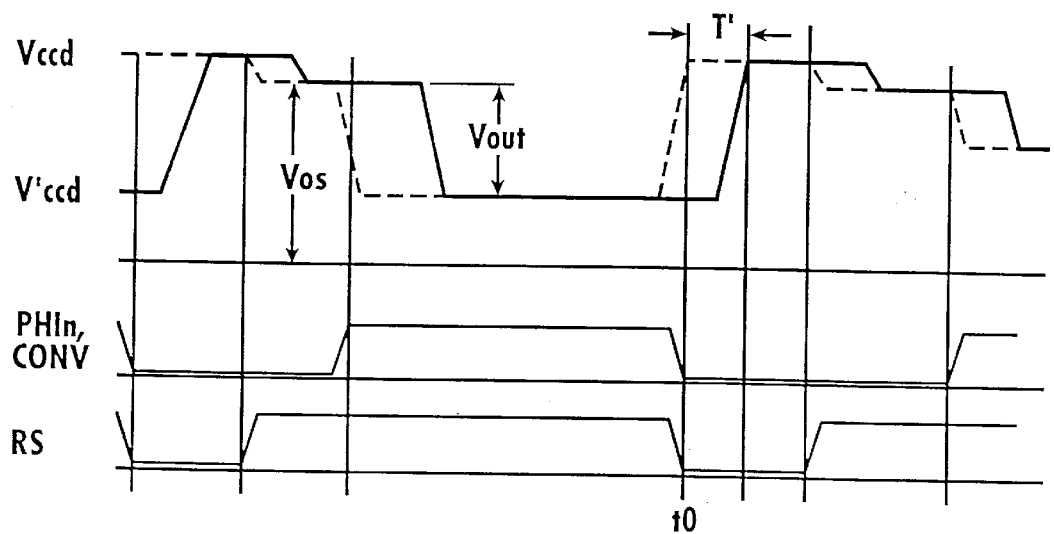
FIG. 1(B)

_5,909,243_

METHOD AND SYSTEM FOR DIGITIZING SENSOR DATA IN SYNCHRONISM WITH SENSOR DATA READOUT

BACKGROUND OF THE INVENTION

1. Technical Field of the Invention

The invention relates to a method and a system for digitizing analog data. More particularly, the invention relates to a method and system for digitizing data that have been generated by an image sensor including a charge coupled device (CCD), a MOS-imager which is also known as a "charge injection device", and the like.

2. Description of Related Art

Charge coupled devices usually include a large number of light sensitive cells which generate and hold electric charges in response to light incident thereupon. The charges accumulated in each cell during a certain integration time are then transferred to one or more outputs of the CCD and are converted into electric voltages under the control of and in synchronism with a clock signal.

The analog data obtained in this way at the output of the CCD are supplied to an A/D-converter (ADC) via a conditioning circuit in which the offset and the gain factor are adapted to the input characteristics of the ADC.

A block diagram of a conventional CCD system of this type is illustrated in FIG. 3A. A CCD-array 10 supplies CCD-data $V_{ccd}$ to the conditioning circuit 12 the output of which is connected to the data input of ADC 14. In this example, the CCD-array is of a type which is controlled by a clock signal PHI, the inverted clock signal PHIn and a reset signal RS.

The waveforms of the signals $V_{ccd}$, PHI and RS are shown in FIG. 3B. The signals PHI and PHIn serve as transport clock pulses by which the charges accumulated in the CCD cells are shifted through analog shift registers to the output port of the CCD-array which operates as a charge/voltage converter. The signal RS provides reset pulses for this charge/voltage converter. When the converter has been reset in the "low" period of the signal RS, the output port assumes a voltage $V_{os}$ which corresponds to a CCD cell which has not been exposed to light. At the subsequent transition of the signals PHI and PHIn, the next charge quantity is transferred to the output port and converted into a voltage $V_{out}$ which represents the amount of light that has been received by the corresponding CCD cell. This voltage $V_{out}$ has to be converted into digital data by the ADC 14. Accordingly, the ADC has to be controlled by an appropriate converter clock signal CONV in such a manner that the voltage of the signal $V_{ccd}$ is sampled and converted at a time $t_0$ within the period in which this signal is valid, i.e. has the value $V_{out}$.

As is shown in FIG. 3B, the converter clock signal CONV is a pulse signal which is obtained by delaying the clock signal PHI by a predetermined delay time T. The voltage values are digitized at the H/L-transitions of the signal CONV.

The converter clock signal CONV with the appropriate delay can be obtained in various ways, two of which are illustrated in FIGS. 4 and 5.

In FIG. 4, the signal CONV is derived from the clock signal PHI by means of a delay circuit 16. The delay circuit 16 may be formed for example by a series connection of a certain number of buffers each of which has a certain delay time, so that the total delay time is determined by the number of buffers. However, this implementation has the drawback that the delay times of commercially available buffers are known only within certain tolerances and the tolerances of the individual buffers in the series connection are accumulated, so that the total tolerance of the delay circuit 16 may become too large.

Alternatively, a delay circuit 16 may be used which is specifically designed for delaying a logic signal with a well defined delay time. However, such delay circuits are comparatively expensive and may not be commercially available for the specific delay time which is needed in a given application. In such cases, a user specified device would have to be developed which would increase the costs even more.

In another known implementation which is shown in FIGS. 5(A) and (B), all the signals PHI, PHIn, RS and CONV are derived from a common basic clock signal CLK using a timing circuit 18 which is made up of a number of digital counters and may be considered as a state machine. In this case, the durations of the H and L periods of all signals output by the timing circuit 18 can only be integral multiples of the period of the basic clock signal CLK. Accordingly, in order to achieve a sufficient time resolution, the basic clock signal CLK must have a comparatively high frequency. Such a high frequency clock signal may be difficult to generate and may be unfavorable because it leads to the generation of electromagnetic noise and to problems of electromagnetic compatibility (EMC).

In addition, these known techniques have the disadvantage that the digital output signal of the ADC 14 is delayed relative to the clock signal PHI, so that an additional step is necessary for synchronizing the digital output of the ADC 14 with the system clock CLK.

This specific problem is addressed by a system disclosed in DE-A-36 24 252. In this system, as is shown in FIG. 6, the clock signal PHI, PHIn is directly applied to the control input of the ADC 14 and serves as the converter clock signal CONV. The correct time relationship between the operations of the CCD-array 10 and the ADC 14 is established by appropriately delaying the clock signal PHI, PHIn supplied to the clock input of the CCD-array 10. Thus, the output of the ADC 14 remains synchronized with the original clock signal PHI, PHIn. However, the above-mentioned problems relating to the provision of a delay device which can delay a logic clock signal with sufficient accuracy and reliability are still encountered in this system.

SUMMARY OF THE INVENTION

It is an object of the invention to provide a method and system for digitizing analog data in which the desired time relationship is established between the operation of the ADC and that of the analog data generator (CCD). Another object is to establish this desired time relationship with high accuracy and with simple, robust and low-cost hardware.

According to the invention, instead of delaying a clock signal, the analog output signal of the data generator is delayed in an analog delay circuit.

An analog delay circuit that is suitable for this purpose can be made up of rather inexpensive components and permits setting the delay time with high accuracy and low error tolerance, so that an efficient mass production of CCD systems becomes possible. The reason is that analog delay circuits are rather insensitive to tolerances in the parameters of its constituents, such as inductance elements, capacitance elements and the like. It is permissible that the analog delay circuit distorts the waveform of the analog signal to some extent, as long as the portion of the output signal $V_{ccd}$ which represents the valid data $V_{out}$ remains unaffected for a time interval long enough for the ADC to sample the voltage value. Thus, the construction of the analog delay circuit is simpler than that of a dedicated delay circuit for digital logic signals which is normally equipped with a pulse-shaping output stage.

By appropriately adjusting the parameters of the delay circuit, the delay time may be set to any desired value (steplessly) without any need for a high frequency basic clock signal. Thus, the highest clock frequency occurring in the system will be that of the clock signal PHI supplied to the CCD-array. As a consequence, a clock frequency may be selected for the clock signal PHI in order to obtain a fast image sensor without causing EMC problems.

In addition, the clock signal PHI (or the inverted clock signal PHIn, or the signal RS) can be used directly for controlling the ADC, thereby achieving a high robustness of the system as a whole, since the digital output signal obtained from the ADC will intrinsically be synchronized with the clock signal.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein:

FIG. 1(A) is a block diagram of a CCD system according to the invention;

FIG. 1(B) illustrates waveforms of signals occurring in the system shown in FIG. 1(A);

DETAILED DESCRIPTION

Figure 2:
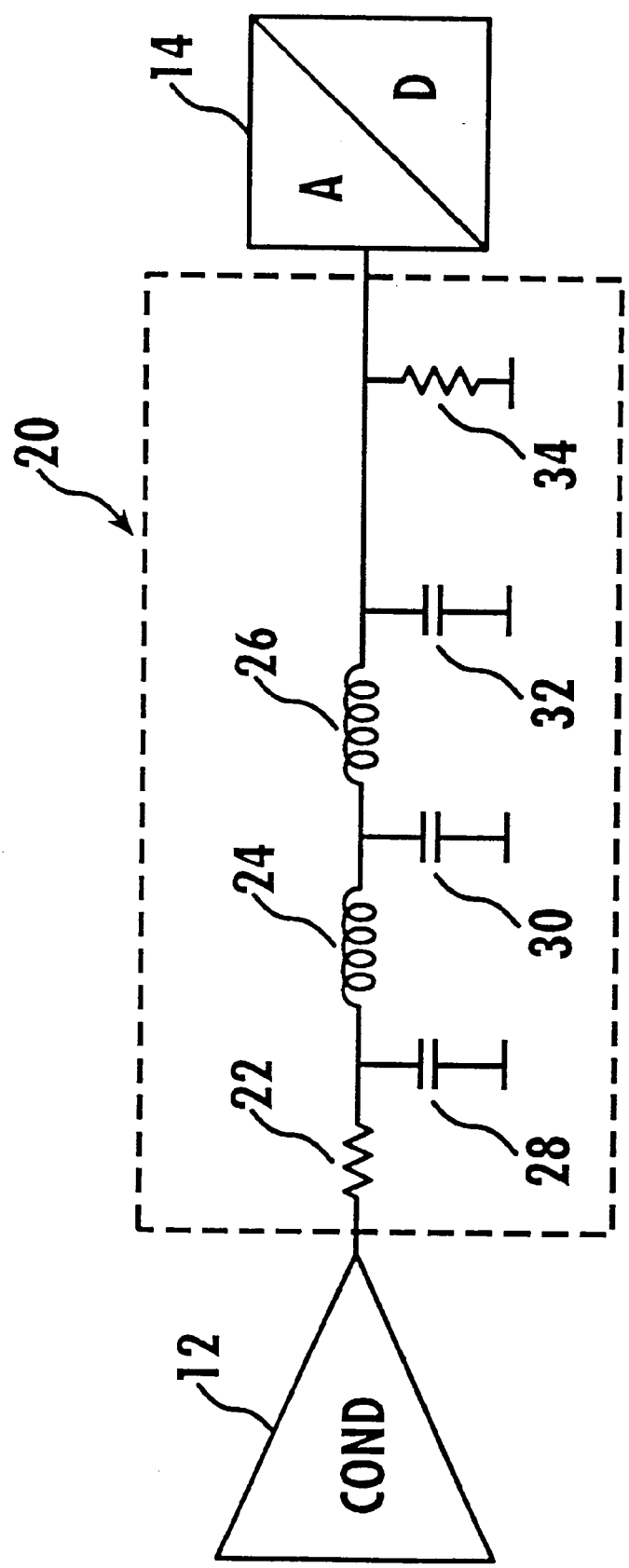
FIG. 2 shows an embodiment of an analog delay circuit according to the invention.
Figure 3A:
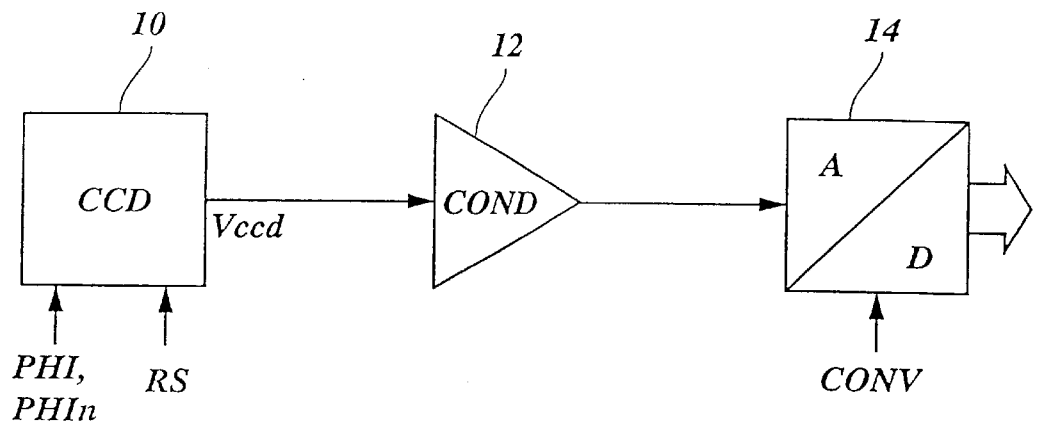
FIG. 3(A) is a block diagram showing the main components of a conventional CCD system.
Figure 3B:
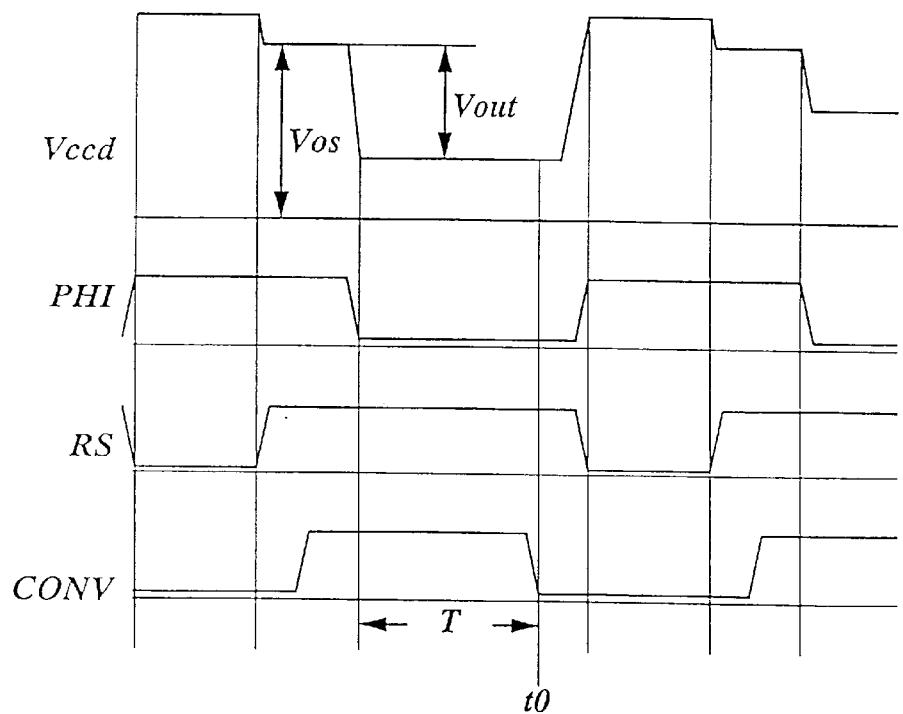
FIG. 3(B) illustrates waveforms occurring in the system shown in FIG. 3(A)
Figure 4:
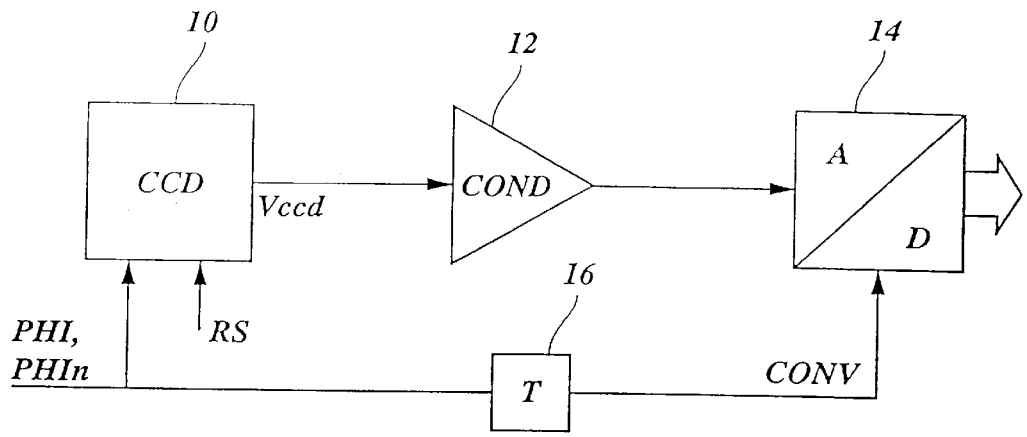
FIG. 4 is a block diagram of another conventional CCD system.
Figure 5A:
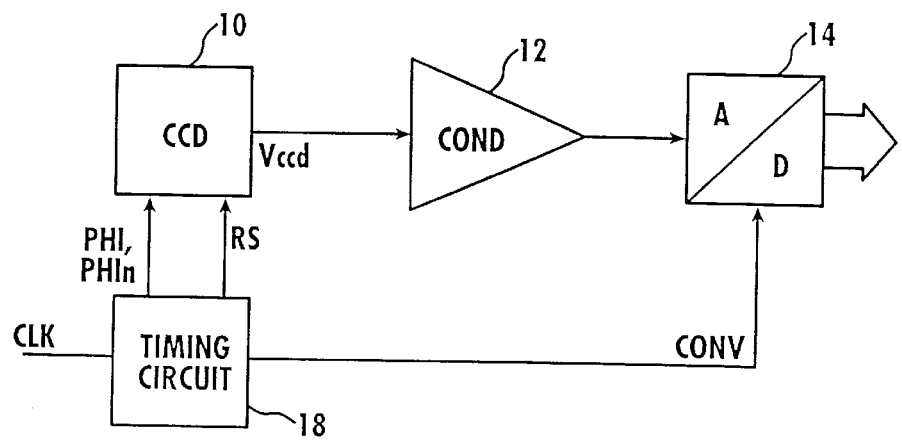
FIG. 5(A) is a block diagram of yet another conventional CCD system.
Figure 5B:
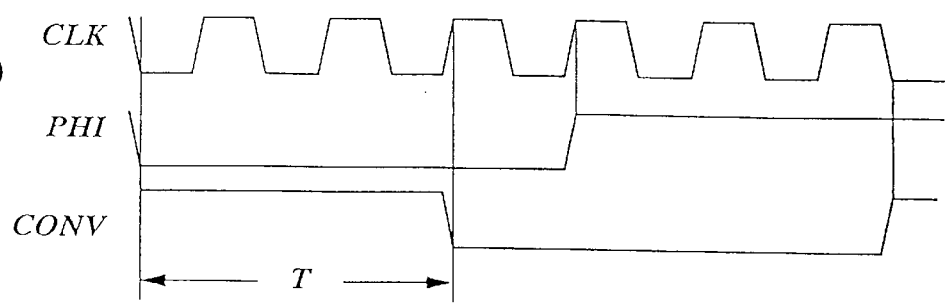
FIG. 5(B) illustrates waveforms occurring in the system shown in FIG. 5(A)
Figure 6:
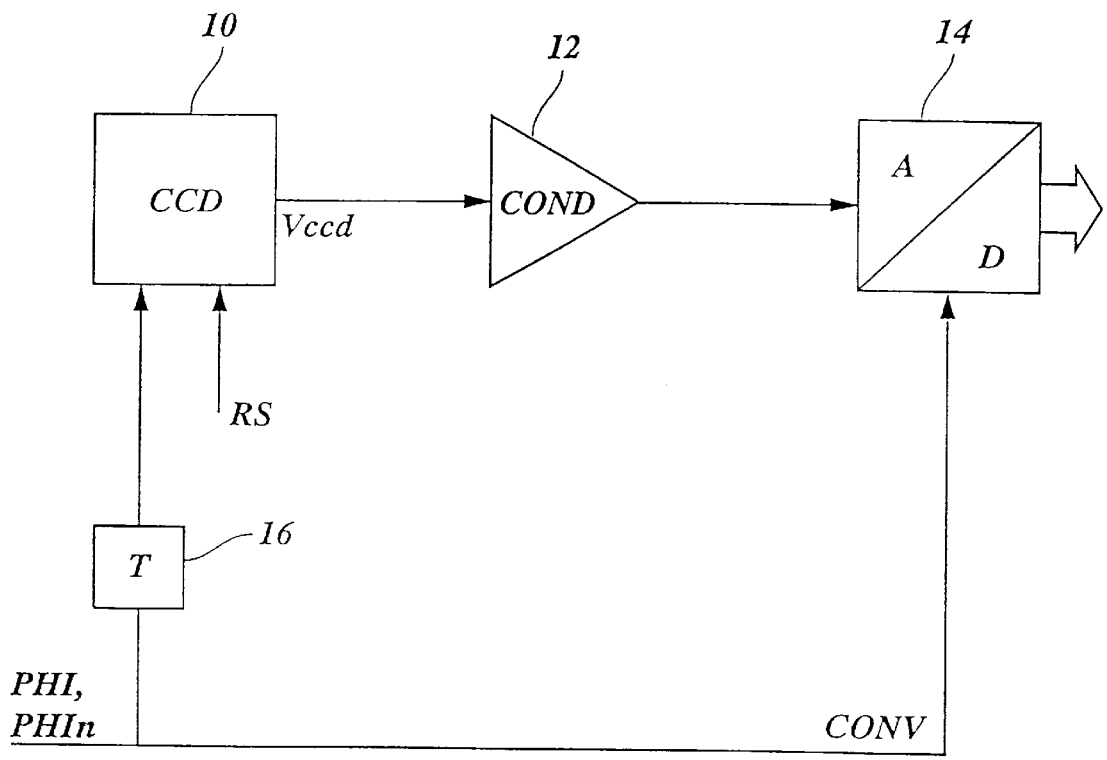
FIG. 6 is a block diagram of still another conventional CCD system.

In the following description, those parts of FIG. 1 which have already been referred to in the description of the prior art in conjunction with FIGS. 3 to 6 will be designated with the same reference numerals.

As can be seen in FIG. 1(A), the clock inputs of the CCD-array 10 and the ADC 14 are directly connected with each other and, accordingly, the converter clock signal CONV is identical with one of the clock signals (PHIn) supplied to the CCD-array 10.

A low-pass filter 20 (LPF) has been inserted between the output of the conditioning circuit 12 and the ADC 14. The LPF 20 serves as an analog delay circuit which delays the output signal of the conditioning circuit 12 by a predetermined delay time T'.

The analog delay circuit may simply be formed by an all-pass filter or a low-pass filter, such as an LC-filter. Since the delay time of such a filter is dependent on its order (i.e., the number of complex impedance elements involved) and on its cut-off frequency (in case of a low-pass filter), the delay time can easily be adjusted by appropriately selecting the order and the cut-off frequency, respectively. In order to avoid a significant distortion of the analog signal, the filter should provide the same delay time for all frequency components passing therethrough.

A low-pass filter has the additional advantage that undesirable high-frequency noise is filtered-out. The cut-off frequency should be significantly higher than the frequency of the clock signal PHI in order to make sure that the waveform of the output signal of the CCD-array is not distorted too much. It has been found that a Bessel filter, for example a fifth-order Bessel filter, is particularly useful in the invention.

In the preferred embodiment, the LPF 20 is a fifth-order Bessel filter which has the construction shown in FIG. 2. Resistor 22 and two inductance elements 24, 26 are connected in series between the output of the conditioning circuit 12 and the data input of ADC 14. Capacitors 28, 30 and 32 are connected between ground and the junction point of resistor 22 and inductance element 24, the junction point between the inductance elements 24 and 26 and the junction point between the inductance element 26 and the ADC 14, respectively. Another resistor 34 is connected in parallel with the capacitor 32.

The resistance, capacitance and inductance values are so selected that the cut-off frequency of the LPF 20 is approximately four times the frequency of the clock signal PHIn. Under these conditions, the LPF 20 will preserve the voltage level $V_{out}$ of the CCD signal $V_{ccd}$ with sufficient accuracy, so that the analog-to-digital conversion will not be adversely affected by the presence of the LPF 20.

In FIG. 1(B) the original (undelayed) signal $V_{ccd}$ is shown using a dashed line whereas the delayed signal $V'_{ccd}$ is shown using a solid line. The ADC 14 is controlled by the converter clock signal CONV (=PHIn) to read and convert the delayed signal $V'_{ccd}$ at the timings $t_0$ when the signal CONV drops from a high level to a low level. At these instances to, the read voltage has the value $V_{out}$ which represents the amount of light received by the corresponding CCD cell.

While a specific embodiment has been described, it should be noted that the invention is not limited to this embodiment but encompasses all possible modifications that will occur to a person skilled in the art and are covered by the appended claims. For example, since the H/L-transitions of the signal RS coincide with those of PHIn, it is possible to use RS as the converter control signal. Accordingly, the signal RS should be considered as a "clock signal" in the meaning of the claims. In addition, the invention is also applicable to a system in which the analog data source (CCD or equivalent) operates with only one clock signal and/or the ADC is active at the L/H-transitions of the control signal CONV applied thereto.

Although the invention has been described in terms of converting the output of a single CCD element, it is to be understood that this invention encompasses converting the output of a CCD array or, more generally, the output of an analog data generator.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for digitizing analog data, comprising the steps of:

generating clock signals;

generating analog data periodically as a pulse sequence in accordance with the clock signals;

delaying the analog data generated by said generating analog data step; and converting the delayed analog data into digital data by sampling the delayed analog data in synchronism with the clock signals and then digitizing the sampled data, said delaying step including filtering the analog data generated by said generating step, wherein the filtering is tuned to a specific delay to synchronize said generating step and said converting step.

2. The method of claim 1, said delaying step including the step of low-pass filtering the analog data generated by said generating analog data step.

3. The method of claim 2, said low-pass filtering step substantially filtering out frequencies above approximately four times a frequency of the clock signals.

4. The method of claim 1, further comprising the step of conditioning the analog data from said generating analog data step by adjusting gain and offset of the analog data and supplying the conditioned analog data to said delaying step.

5. An apparatus for digitizing analog data, comprising:

clock means for generating clock signals;

analog data generating means for periodically generating analog data as a pulse sequence in accordance with the clock signals;

an analog delay circuit receiving the output of said analog data generating means and delaying the analog data; and an analog/digital converter for converting the delayed analog data into digital data by sampling the delayed analog data in synchronism with the clock signals and then digitizing the sampled data, said analog delay circuit including an analog filter having filter characteristics tuned to a specific delay to synchronize said analog data generating means and said analog/digital converter.

6. The apparatus of claim 5, wherein said analog delay circuit includes an analog low-pass filter.

7. The apparatus of claim 6, said analog low pass filter substantially filtering out frequencies above approximately four times a frequency of the clock signals.

8. The apparatus of claim 6, wherein said analog low-pass filter is an analog Bessel filter.

9. The apparatus of claim 8, wherein said analog Bessel filter is a fifth-order analog Bessel filter.

10. The apparatus of claim 8, wherein said analog data generating means is a CCD-array.

11. The apparatus of claim 8, wherein said analog data generating means is an MOS-imager.

12. The apparatus of claim 6, wherein said analog data generating means is a CCD-array.

13. The apparatus of claim 6, wherein said analog data generating means is an MOS-imager.

14. The apparatus of claim 5, further comprising a conditioner circuit for conditioning the analog data received from said analog data generating means by adjusting gain and offset of the analog data and supplying the conditioned data to said analog delay circuit.

15. The apparatus of claim 5, wherein said analog data generating means is a CCD-array.

16. The apparatus of claim 5, wherein said analog data generating means is an MOS-imager.

* * * * *